INVENTOR.
Norman F. Bounsall
BY Robert S. Clay
Attorneys

INVENTOR.
Norman F. Bounsall
BY
Robert S. Clay
Attorneys

INVENTOR.
Norman F. Bounsall
BY Robert G. Clay
Attorneys

Sept. 19, 1967 N. F. BOUNSALL 3,342,932

DIGITAL CONTROL SYSTEM FOR ANIMATION EFFECTS WITH A TELEVISION SIGNAL RECORDER

Filed Dec. 9, 1963 4 Sheets-Sheet 4

INVENTOR.
Norman F. Bounsall

BY Robert G. Clay

Attorneys

United States Patent Office 3,342,932

Patented Sept. 19, 1967

3,342,932

DIGITAL CONTROL SYSTEM FOR ANIMATION EFFECTS WITH A TELEVISION SIGNAL RECORDER

Norman F. Bounsall, Palo Alto, Calif., assignor to Ampex Corporation, Redwood City, Calif., a corporation of California Filed Dec. 9, 1963, Ser. No. 329,033

9 Claims. (Cl. 178—6.6)

This invention relates to digital systems for providing control of programmed functions, and particularly to a system for selectively recording and revising program material through use of a television signal recording system.

In the electronic data processing arts, it is well known to utilize a decoding or gating matrix of diodes, switches or other elements in conjunction with a binary counter or register. Particular code combinations presented by the counter or register are identified by changes in the signal levels occurring at specific points within the matrix. Thus a binary code pattern presented by the counter or register may be converted to a decimal code, or a one-of-a-number code, for readout indications or for other control functions. It is also known in the electronic data processing arts to control the counter or register, or other binary indicator by input control circuits which upon command may insert a specific binary count. By thus presetting a counter to a particular count, the system may for example thereafter proceed through a desired subroutine or controlled sequence. The control circuits utilized for presetting purposes, however, are separate from the gating matrices which operate in response to the states of the counter stages themselves. In contrast, systems provided in accordance with the invention permit the same matrix to be used both for identification of particular binary patterns and for the purpose of presetting a binary register or counter system to a selectable pattern.

While control and programming systems in accordance with the present invention are of general application, they are of particular advantage in complex control systems such as those which are used in recording and revising television program material. In applicant's copending U.S. patent application, Ser. No. 142,328, filed Oct. 2, 1961, and now U.S. Patent No. 3,180,930 and assigned to the assignees of the present invention, there have been described electronic systems which can be utilized in achieving animation effects in recorded television program material. Such systems may use cue pulses and associated controls to identify the last previous frame of a recording, then add a specific number of additional frames and immediately return to a state of readiness for another sequence of frames. By changing the position of the scanned objects by incremental amounts, the desired animation effect is achieved on playback of the recording. The number of frames added for each animation step are determined during each sequence by counting the frames after termination of the last previous recording.

The problems involved in revising segments of recorded animation material will be understood to be considerable upon reviewing the above-identified patent application. Usually, such revisions must be introduced by a manual splicing technique, or by a manual location and marking technique. Alternatively, the tape may be reversed and run through the transport backwards, provided that the various record, erase and playback elements along the tape are appropriately shifted in position, and tape movements and tensions are appropriately controlled. The expense and difficulty in achieving proper operation of the system when operating in this reversed fashion does not justify modification of the machine for this limited purpose. It is therefore necessary, when an error occurs in an animation sequence, to repeat the entire sequence, or to use one of the manual correction methods or a trial and error method of erasing the tape. Because each animation segment is observed as it is added, it is sufficient for the great majority of animation applications to be able to correct only the last segment of a previous sequence of recorded frames.

It is therefore an object of the present invention to provide an improved binary count indicating and presetting system for control applications.

It is another object of the present invention to provide an improved animation system for television program recorders.

Yet another object of the present invention is to provide means for correcting previously recorded material in animation sequences generated through use of a television tape recorder.

These and other objects of the present invention are met by the provision of a combined count indicating and presetting system having elements coupled in a gating matrix which is connected to particular bistable elements of a binary counter. The gating matrix has particular terminals coupled to a selector, which produces selected signal levels representative of the count pattern presented at the counter, and which therefore may provide output indications from the system. The same gating matrix is also used in a bilateral fashion, however, so that upon application of an appropriate presetting signal the bistable elements may be set into a desired count relationship for further control sequences.

In one specific example of a television program recorder, an "animate erase" mode may be added for the performance of animation functions in an editing system. As in the editing systems previously employed, cueing pulses denoting each individual frame are recorded in one track in conjunction with the television program material and edit pulses may be derived from an appropriate studio synchronizing source to accurately time the beginning of each new frame. The system employs fixed and known spacings between the cue playback head, the cue record head, and the video heads. Cueing pulses for the last previously recorded frames are detected at known times prior to the arrival of the recording at the erasing and recording positions for both the video portions and the cueing pulses. When it is desired to "animate," the system operates on a timed sequence to turn on and off the various erase and record functions so that new frames and new cueing pulses are added at the end of the previous recording. When it is desired to "animate erase," the system is arranged to count in a subtractive sense so as to effect erasure of a given number of cueing pulses, and thus to permit erasure of the video frames of the previous animation sequence during a subsequent animation sequence.

Automatic erasure is effected solely by choice of the proper operating mode through the operation of the system and the use of the bilateral matrix in the control system. When operating in the "animate" mode, a counter, a matrix and an associated count selection system terminate the animation sequence when the desired number of edit pulses, which are used in timing the newly added frames, have been counted. When the system is switched to "animate erase," however, the counter is initially set to a desired count indicative of the number of previously recorded frames to be erased by an initializing pulse applied through the selection and gating matrix to the appropriate input terminals of the counter. The counter will thereafter count edit pulses designating individual frames until another fixed count is reached which is determined by the spacing between the cue playback and the cue erase heads. When this count is obtained, subsequent cueing pulses are thereafter erased.

The next animate sequence may then be initiated, during which sequence the video portion associated with the erased cueing pulses is automatically corrected.

A better understanding of the invention may be had by reference to the following description, taken in conjunction with the accompanying drawings, in which.

Figure 1:
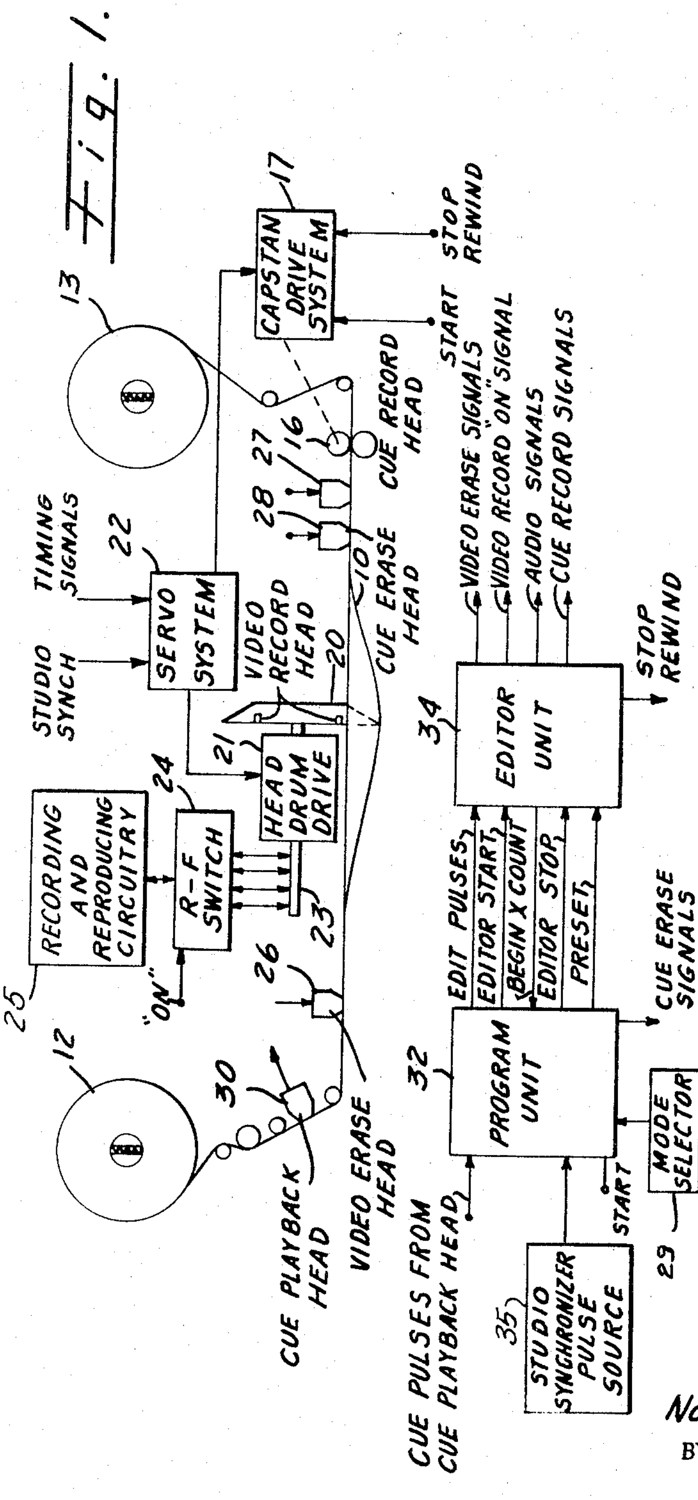
FIG. 1 is a simplified block diagram representation of a program control system for a television tape recorder, including a combined count indicating and presetting system.
Figure 3A:
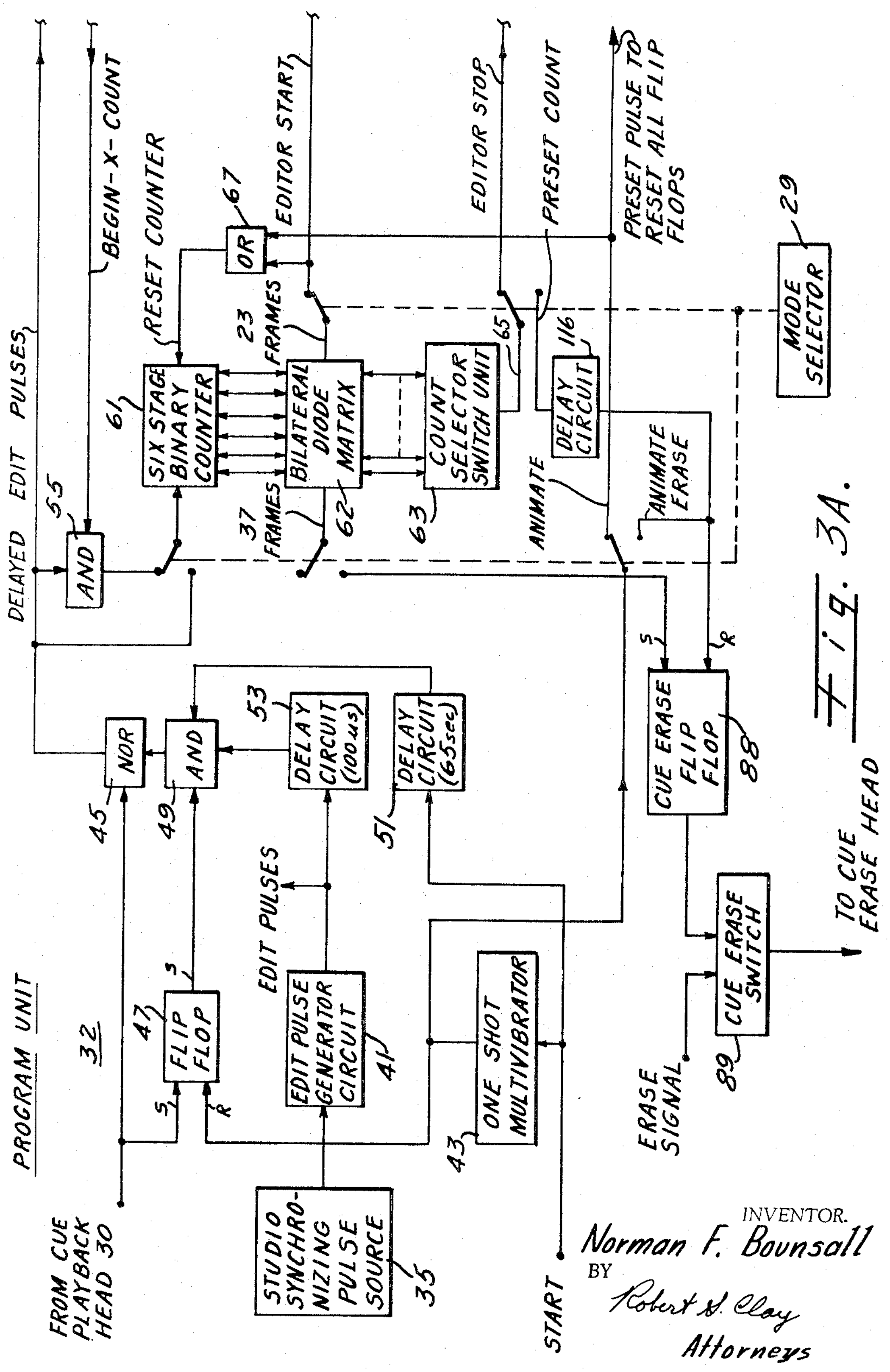
Figure 3B:
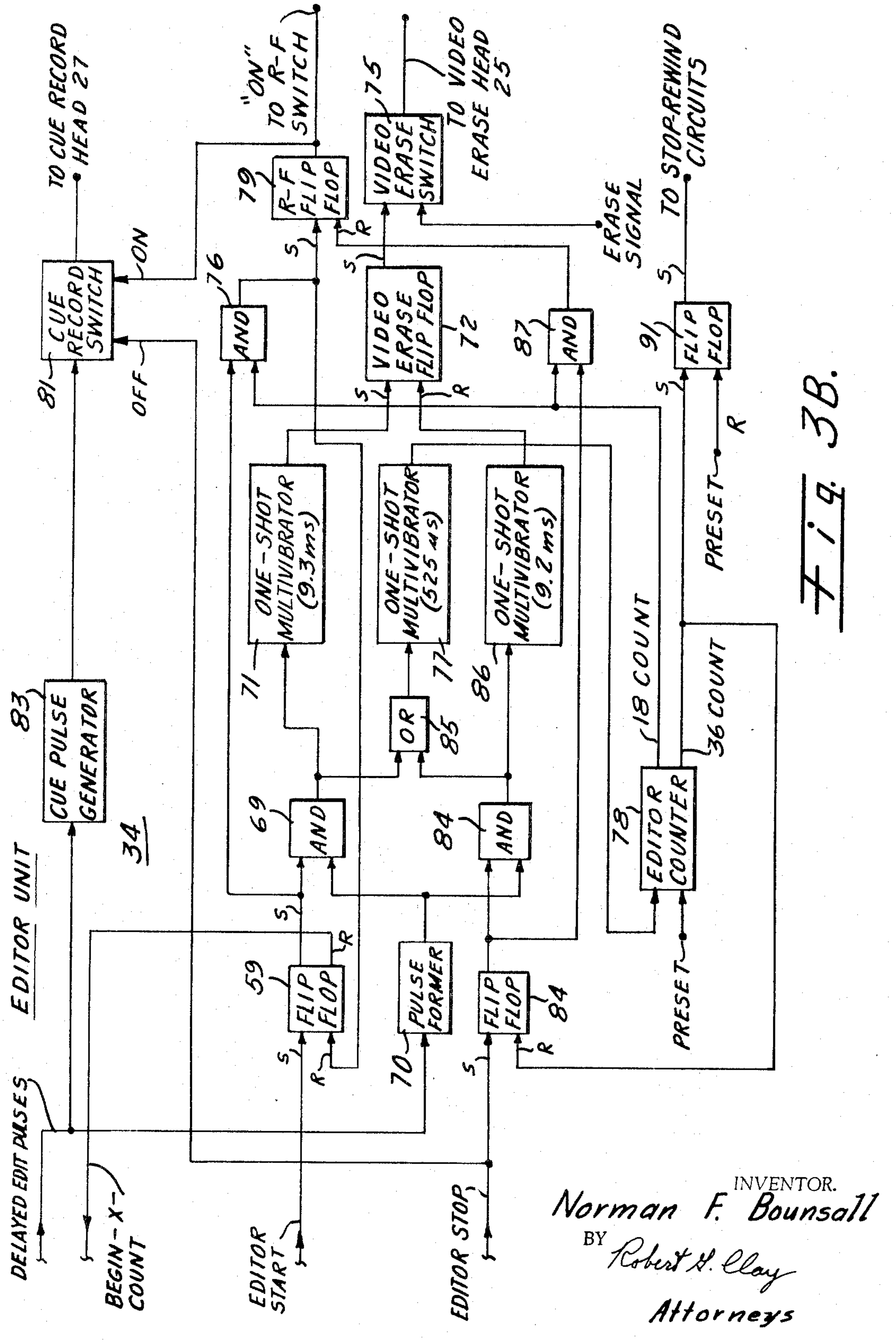
Figure 4:
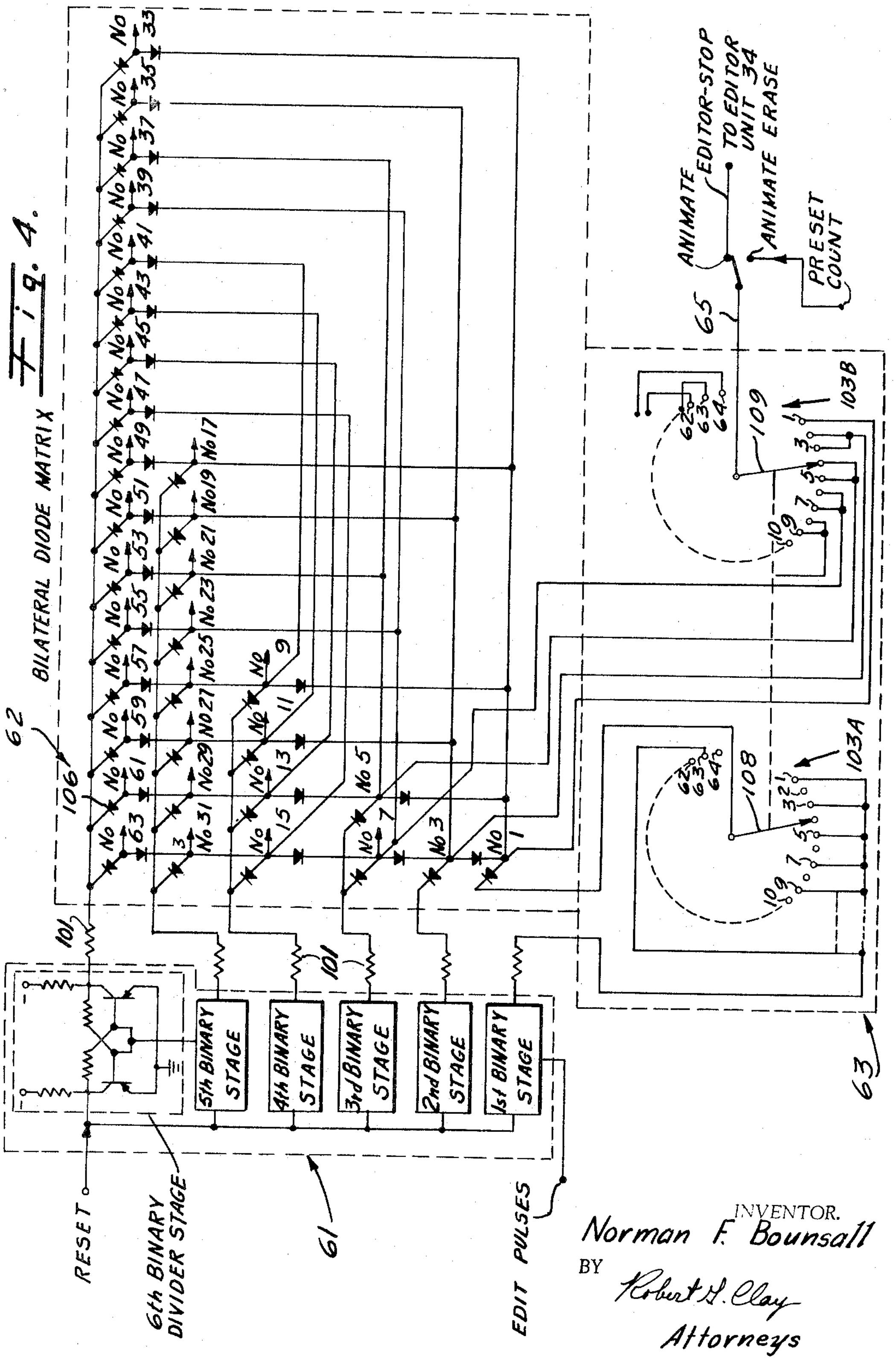

FIG. 3, comprising FIGS. 3A and 3B, is a more detailed schematic and block diagram representation of the editor and cueing units of FIG. 1; and FIG. 4 is a detailed schematic and block diagram representation of a combined count indicating and presetting system such as may be employed in the system of FIG. 1.

The system shown in FIG. 1 is an idealized representation of the principal elements of the type of transverse track recording and reproducing system which is most widely used for television program material. A relatively wide magnetic tape 10 is transported between a supply reel 12 and a takeup reel 13 in a well known fashion, being driven by a capstan 16 operated by a capstan drive system 17, the details of which are well known in the art and need not be discussed in detail. Various recording and reproducing heads are disposed along the path of the tape 10, the principal recording and reproducing machanism being provided by a head drum 20 having a number of peripheral magnetic recording and reproducing heads. The head drum 20 rotates about an axis substantially parallel to the direction of movement of the tape 10, so that the heads successively scan along different transverse tracks across the tape 10 as the tape is moving. A head drum drive mechanism 21 and the capstan drive system 17 are controlled from a servo system 22 which receives studio sync signals or timing signals from the timing track (not shown) on the tape as reference signals for the control of timing.

The video signals to be recorded are supplied to or the reproduced video signals are returned from the head drum 20 through an appropriate contact system 23 and a radio frequence switch 24 to recording and reproducing circuitry 25. A high degree of time base accuracy and stability is achieved by such systems, because various complementary controls may be exercised during operation. Thus servos may be used to control not only the head drum rotation but also the capstan speed and further to control the position of the tape 10 about the head drum 20, if desired, through a female guide mechanism (not shown). An electronic time base compensation may be employed as well, if desired. Details of the overall system which are not germane to the present control system have been omitted for simplicity, although their use will be understood by those skilled in the art.

Prior to the recording position for the transverse video tracks a, video erase head 26 is positioned along the path of the tape 10 and separated from the head drum 20 by a known fixed distance. At another position along the tape 10, a cue record head 27 is mounted adjacent one edge of the tape for recording a longitudinal cue track, this track being to one side of the useful video recording area. A cue erase head 28 is positioned a short distance upstream of the cue record head 27, and a cue playback head 30 is positioned on the opposite side of the head drum 20 from the cue record and erase heads 27, 28 respectively. Thus the cue playback head 30 is furthest upstream of all heads relative to the tape 10.

These elements of a wideband recording system cooperate with the various units of a program control system which may take the form shown in the above-identified application. Preferably, the various elements are arranged so as to include a mode selector. The mode selector 29, normally manually operated on the panel of the program control console, permits the selection of the "animate" "animate erase" or other modes. While, as described in conjunction with the previously identified application, many other operating modes may also be achieved, the description will be concerned solely with the elements involved in the "animate" and "animate erase" modes.

When the system is operated in the "animate" mode, it is necessary to identify the last frame previously recorded and to provide a desired number of additional frames, the quantity X being here employed to designate the number of desired additional frames. When operating in the "animate erase" mode, it is desired to indicate a different count represented by a difference between a fixed number, here termed Y, and the value of X. These functions will be explained in detail hereinafter.

Generally, the systems operate under the control of a program unit 32 and an intercoupled editor unit 34. The program unit 32 provides circuitry for identifying the position on the tape 10 at which the editing operation is to take place as well as the number of frames involved. The editor unit 34, on the other hand, responds to the signals from the program unit 32 to operate the various heads at the appropriate times in accordance with their relative positions along the tape to carry out the desired editing operating.

When the system shown herein is used for recording an animated sequence, a cueing pulse is recorded alongside each individual video frame. Therefore, in general terms, the operation of the program and editor units 32 and 34 may be explained as follows. Assuming that the tape has been rewound to some point in the previously recorded material, a start signal may then be supplied to the program unit 32 to initiate the forward movement of the tape. The start signal is also used to generate a "preset" pulse for setting various gates and flip-flops within the units 32 and 34 to an initial state. After the tape 10 has attained the proper speed, the cue playback head 30 can then begin reading cueing pulses which are supplied to the program unit 32. When the last cueing pulse has been read from the tape 10, this is sensed by the program unit 32 to indicate the end of the previously recorded animation sequence.

At a given time after the last cue pulse has been read by the cue playback head 30, an editor start pulse is sent from the program unit 32 to the editor unit 34 to initiate operation of the different heads to perform the desired editing operation. The editor unit 34 then operates in accordance with a timed sequence to provide signals to the various video record, cue record and cue erase heads. A signal is also sent back from the editor unit 34 to the program unit 32 at an appropriate time so that the program unit 32 counts the number of frames which are to be added or corrected. After completion of the count, during which the desired number of frames has been added or corrected, the editor unit 34 is then turned off by an editor-stop signal from the program unit 32, and a conventional rewind operation of the tape 10 begins.

Edit pulses derived from studio synchronizing pulses from a source 35 are counted at different times by various frame counters within the program unit 32 and the editor unit 34. These edit pulses are also employed within the editor unit 34 for accurately timing the beginning of each newly recorded frame.

Figure 2:
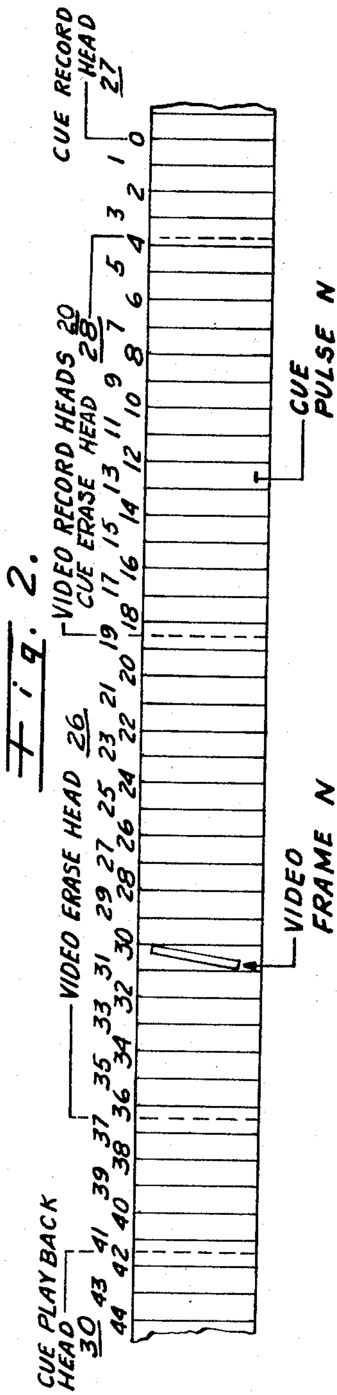
FIG. 2 is a simplified representation of the patterns recorder on a tape in the system of FIG. 1, also showing the relative disposition of the various heads.

The operation of this system in the "animate" and "animate erase" modes may best be understood by first making reference to FIG. 2, which represents in diagrammatic form the relative positions of the various heads along a tape wherein the successive frame segments are numbered for the purpose of this illustration. The distances and frame spacings shown are those for a recording made at the rate of thirty frames per second with a typical editor system installation. As shown, the cut record head 27 is located furthest downstream of any of the heads, while the cut playback head 30 is positioned forty-one frames upstream from the cue record head 27. Therefore, a given cueing pulse which has been recorded in association with a specific frame is played back forty-one frames prior to the point at which a new cueing pulse for the same frame would be recorded. Thus, during an animation sequence which requires the addition of new cueing pulses along with the added frames, the system should begin adding the new cueing pulses forty-one frames after the last cueing pulse from the previously recorded sequence has been sensed. On the other hand, during an "animate erase" operation, in which it is desired to erase the last of the previously recorded sequence of frames, a spacing of thirty-eight frames between the cue playback head 30 and the cue erase head 28 must be taken into account. Therefore, when the system is in the "animate" mode, the recording of new cueing pulses should begin exactly forty-one frame intervals after the last previously recorded cueing pulse has passed the cue playback head 30; whereas, during the "animate erase" mode, the erasure of the previously recorded cueing pulses should begin exactly thirty-eight frame intervals minus the desired number of frame intervals after the last previously recorded cueing pulse passes the cue record head 30.

The cue record head 27 is located eighteen frames distant from the instantaneous position of a video record head on the drum 20. Accordingly, as illustrated by the video frame N and its corresponding cue pulse N, each cue pulse is located on the tape in a position eighteen frames upstread of its corresponding video frame. In this manner the video signal may be recorded by the video record heads on the drum 20 at the same time that cue pulses are being added by the cue record head 27. Thus, during the "animate" mode the video erase head 26, which is positioned five frames downstream from the cue playback head 30, is actuated twenty-three frame intervals after the last previously recorded cueing pulse passes the cue playback head 30 in order that the portion of the tape past the last previously recorded video frame may be cleaned for later video recording.

The details of the operation of the system may be explained by reference to the more detailed circuit diagram of FIG. 3, while also bearing in mind the exemplary spacings of the heads shown in FIG. 2 and the general description of FIG. 1. The program unit 32 includes a number of different functional units which provide various control functions in addition to the functions of count detection, cue pulse erasure and presetting for the "animate" and "animate erase" modes which are to be undertaken. These control circuits include an edit pulse generator circuit 41 for deriving edit pulses from the higher frequency studio synchronizing pulse source 35. These edit pulses may be employed to initiate the recording of each additional frame so that the frame sequence is synchronized with a central time reference from the studio synchronizing pulse source 35.

The particular mode of operation is chosen either manually or automatically by a mode selector 29, usually located on the front panel of the system. This mode selector 29 may simply be a manually operated switching arrangement mechanically coupled (as illustrated by the dashed lines) to various multi-positioned mode selector switches within the system. For simplicity, the various mode selector switches have been shown as two position switch devices in which the upper position (as illustrated in the drawing of FIG. 3) represents the "animate" mode and the lower position represents the "animate erase" mode. It should be understood, however, that various conventional electronic switching or gating arrangements may be employed to provide automatic mode selection.

The program unit 32 contains a one-shot multi-vibrator 43 for generating a short duration preset pulse to be used in presetting the various elements within the program unit 32 and editor unit 34 to an initial condition to carry out the desired operations. In addition, the program unit 32 contains circuitry to generate a "last frame' indication, which then permits edit pulses to be counted within the program unit 32 and editor unit 34 to designate the additional frame intervals. The reproduced cueing pulses from the cue playback head 30 are applied to a "NOR" gate 45 and are also applied to the set input terminal (S) of a flip-flop 47, which has been previously preset to its opposite reset state (R) by the preset pulse from the one-shot multivibrator 43. The set output from the flip-flop 47 conditions a three input "AND" gate 49, the output signal from which is applied to the other input terminal of the "NOR" gate 45. A run-up time of six seconds is provided by a delay circuit 51, thereby permitting the system to attain a stable operating speed, after which a start signal is applied to fully condition the "AND" gate 49. The output signals obtained from the "AND" gate 49 are delayed edit pulses from the edit pulse generator circuit 41, which are permitted to pass through the "NOR" gate 45 only in the absence of cue pulses from the cue playback head 30. Such edit pulses are normally used to designate the beginning of each viedo frame, but these pulses are slightly delayed for a period of about one hundred microseconds by means of the delay circuit 53 so that they correspond in time with occurrence of the cue pulses for each frame.

The foregoing detailed explanation of the operation of portions of the program unit 32 applies to both the "animate" and "animate erase" modes of operation. However, the remainder of this description is best understood by reference to the particular mode of operation.

In the "animate" mode, all the mode select switches are in the upper position as shown in FIG. 3. As soon as there is an absence of a cue pulse from the cue playback head 30, the slightly delayed edit pulses from the output of the "NOR" gate 45 are applied to the input of another "AND" gate 55. The "AND" gate 55 is conditioned to pass the edit pulses by a "begin-X-count" signal, which is obtained from the reset output (R) of an editor-start flip-flop 59 in the editor unit 34. Edit pulses passing through the "AND" gate 55 are counted in a six stage binary counter 61 within the program unit 32.

The binary counter 61 consists of a number of binary stages, here six in number. Each of the binary stages may consist of a conventional binary element, such as a two-transistor flip-flop having suitable interconnections so that it may be shifted alternately into either of two stable states, the connection between stages being in conventional counter fashion suitable for advancing the total count in binary sequence. The outputs from the stages of the counter 61 are interconnected with a bilateral diode matrix 62 and count selector switch unit 63 to form a unique count indicating and presetting system to be explained in more detail hereinafter in connection with FIG. 4. The bilateral diode matrix 62 contains a number of terminals, each terminal representing a specific count within the binary count sequence and assuming a given output condition when the specific count is contained within the counter 61. The count selector switches within the unit 63 permit the operator to select any one of the particular terminals for connection to a single access line 65. In addition, individual output lines may be permanently connected to certain of the terminals for indicating the attainment of a fixed count.

In the "animate" mode, the counter 61 is originally set to an initial zero count by a present pulse being delivered through an "OR" gate 67. After the "last frame" has been sensed, edit pulses are delivered to the six stage binary counter 61 where the count is advanced by a binary one for each delayed edit pulse received. When twenty-three frames have been counted, a "23 frames" output signal is obtained from a fixed connection to the appropriate one of the terminals of the bilateral diode matrix 62, the output signal being delivered as an "editor-start" signal to the editor unit 34 and also being used to reset the counter 61 again to zero through the "OR" gate 67. The editor-start signal is applied to the set input (S) of the flip-flop 59 which switches to its set state from its opposite reset state. The set output (S) from the flip-flop 59 is then applied to enable an "AND" gate 69 to pass the input pulse applied to its other input terminal. A pulse former circuit 70 receives edit pulses from the program unit 32 and provides input pulses to be passed by the "AND" gate 69. The first input pulse passing through the "AND" gate 69 activates a one-shot multivibrator 71 for an interval of 9.3 milliseconds, after which a signal is applied to switch a video erase flip-flop 72 to its set state. The set output (S) of the video erase flip-flop 72 closes a video erase switch 75 to pass erase signals to the erase head 25.

The set output (S) from the flip-flop 59 is also coupled to condition an "AND" gate 76, while the pulses passing through the "AND" gate 69 are coupled through an "OR" gate junction to trigger another one-shot multivibrator 77. The one-shot multivibrator 77 produces short duration pulses of 525 microseconds each, which begin upon occurrence of the editor-start signal and are counted by an editor counter 78 in the editor unit 34. When eighteen pulses have been counted, the editor counter 78 provides an eighteen count output signal to condition the "AND" gate 76 to pass the set output (S) from the flip-flop 59, which is then used to switch an R–F flip-flop 79 to the set state. The set output (S) from the R–F flip-flop 79 turns the R–F switch "ON" thereby passing additional frames of video signals from the recording circuits to the video record heads on the drum 20.

At the same time, the output from the "AND" gate 76 at the end of the eighteen frame count is routed back to reset the flip-flop 59, thereby shutting off the "AND" gate 69 and delivering a begin-X-count" signal to the program unit 32 from its reset output (R) to condition the "AND" gate 55 to pass the delayed edit pulses again to the six stage binary counter 61. Prior to the beginning of the operation, the count selector switches 63 have been employed to connect the access terminal 65 to the desired terminal within the bilateral diode matrix which is indicative of the X count, which represents the desired number of additional frames to be added to the previously recorded material. Thus, when the counter 61 has counted X number of delayed edit pulses, an output signal appears on the access terminal 65, which is then applied as an "editor-stop" signal to the editor unit 34. The "editor-stop" signal is applied directly to the cue record switch 81 to open the switch and stop the recording of further cue pulses.

Within the editor unit 34, the "ON" signal from the R–F flip-flop 79 is also applied to close a cue record switch 81, which then passes new cue pulses to be recorded by the cue record head 27. The new cue pulses are derived from the delayed edit pulses by a cue pulse generator 83 which is triggered by each edit pulse to produce a pulse of proper duration and timing to be recorded with each new video frame. Subsequent resetting of the R–F flip-flop 79, as explained hereinafter, thus opens the R–F switch 24 to stop further video recording.

When the "editor-stop" signal is received by the editor unit 34 from the count selector switch unit 63 in the program unit 32 to indicate completion of the X count, an editor-stop flip-flop 84 is switched to the set condition from its opposite reset state. The set output from the flip-flop 84 is then used to condition an "AND" gate 85 to pass the pulses from the pulse former circuit 70. The first pulse passed through the "AND" gate 85 actuates a one-shot multivibrator 86, which has a 9.2 millisecond active interval, after which an output signal is produced to reset the video erase flip-flop 72 coincident with the trailing edge of a frame interval. Resetting of the video erase flip-flop 72 acts to open the video erase switch 75 to prevent further operation of the video erase head 25.

The set output (S) from the editor-stop flip-flop 84 is also coupled to condition an "AND" gate 87, while the pulses passed through the "AND" gate 85 are applied to the one-shot multivibrator 77 through the "OR" gate junction to produce short duration pulses to be counted by the editor counter 78. When a second eighteen frame count has been completed, another eighteen count output from the counter 78 passes through the "AND" gate 87 to reset the R–F flip-flop 79, thereby turning off the R–F switch 24 and the cue record switch 81. Accordingly, the video and cue recording operations are stopped after the second count is completed.

During operation in the "animate erase" mode, the mode selector 29 is switched so that the movable contact on each of the mode select switches is moved to its lower position, as illustrated in FIG. 3. The access terminal 65 is thereby connected to receive a preset pulse from the one-shot multivibrator 43, which operates through the count selector 63 and the bilateral diode matrix 62 to preset the six stage binary counter 61 to the desired X count. The preset pulse in the "animate erase" mode is also applied to place a cue erase flip-flop 88 in an initial reset state. With the mode select switches in the lower position, the delayed edit pulses from the "NOR" gate 45, which appear after the "last frame" cue pulse has been sensed, are applied directly to the counter 61 to bypass the "AND" gate 55. The counter 61 counts upward from the preset X count toward the Y or thirty-seven frame count representing the number of frames in the interval between the cue playback head 30 and the cue erase head 28. When the six stage binary counter 61 reaches a thirty-seven frame count, a signal is applied from the appropriate terminal within the bilateral diode matrix 62 to switch the cue erase flip-flop 88 to its set state. The set output (S) from the flip-flop 88 is applied to close a cue erase switch 89 to pass an erase signal to the cue erase head 28, thereby erasing X number of the last previously recorded frames.

It should be noted that both in the "animate" and "animate erase" modes it is not necessary to stop the respective erasing operation at any particular time since the operation is only carried out on the last previously recorded frames. Therefore, the stop-rewind may be generated for the "animate," and similarly for the "animate erase" mode by the provision of a simple delay circuit. Conveniently, the system may be stopped for the "animate" mode by the thirty-six count output from the editor counter 78 after completion of the second eighteen frame count, which is initiated by the editor-stop signal. This thirty-six count output is also used to reset the flip-flop 84 for the next sequence, which disables "AND" gate 85 to prevent the editor counter from counting further thereby leaving it at a zero count for the next animate sequence. It should also be understood that various other logical arrangements may be employed within the principle and scope of this invention to carry out the above described operations.

In the program unit counter 61, each of the binary divider stages may consist of a pair of intercoupled transistors, as shown for the sixth stage in FIG. 4. Trigger signals may be applied to the bases of both transistors in a stage, to invert the states of conduction and non-conduction of the transistors in conventional fashion. Reset signals may be applied to the collector of one of the transistors of a pair, and output signals may then be derived at the collector of the other of the transistors of the pair. Equalizing resistors 101 may be coupled to these output terminals of each of the binary divider stages, and provide input connections to the bilateral diode matrix 62.

The bilateral diode matrix 62 is coupled in conjunction with a two pole multi-position switch arrangement 103A and 103B, which is so arranged in accordance with the invention as to provide, together with the matrix 62, both the desired presetting function and the desired count detection function with a reduced number of components. In the matrix 62, diodes 106 couple five of the six input terminals to individual signal junctions, which are designated as number 63, number 31 and the like. It will be recognized, inasmuch as the matrix 62 is bilateral, that the designations input and output may be used properly only in conjunction with a particular mode of operation. It will also be noted that the signal junctions, number 63, number 31 and the like, represents only the odd numbered output values, and that the first binary divider stage is coupled only to the first multi-position selector switch 103A. In this first selector switch 103A, all of the odd numbered switch terminals are coupled together to the first binary divider stage, while the central armature 108 is coupled through the center tap of the switch 103A to the signal junction designated number 1 in the matrix 62. The even valued switch positions are open circuited.

The number 1 junction in the matrix in turn is coupled to the switch terminal designated number 1 in the second switch 103B. In the second switch 103B, however, each even numbered switch terminal is coupled to the next higher odd valued switch terminal, which in turn is connected to the corresponding odd valued junction in the matrix 62. The central armature 109 of the second switch 103B is coupled to the access terminal 65, which delivers the editor-stop signal to the editor unit 34 during the "animate" mode and which receives a preset-count signal through the mode select switch during the "animate erase" mode. The present signal provides a ground or slightly positive potential to the armature 109 of the second armature of the second selector switch 103B. In addition, fixed connections are made from the number 23 junction and the number 37 junction to provide the twenty-three and thirty-seven count output needed.

As previously pointed out herein, the bilateral matrix 62 is preset to zero in the "animate" mode and later provides an editor-start signal to the editor unit 34 to indicate that twenty-three frames, comprising the spacing between the cue playback head 30 and the video record head 20, have passed under the video record head 20 so that the video recording sequence may begin. In the "animate erase" mode, the matrix 62 delivers a start signal to the cue erase circuits in the program unit 32 after a Y count of thirty-seven frames, corresponding to the distance between the cue playback head 30 and the cue erase head 28, so that the erasure of cue pulses may be initiated. This thirty-seven frame count is of course diminished to represent the Y–X quantity by the presetting of X into the counter during the start of operation in the "animate erase" mode. Erase signals are applied to the cue erase head 28 at the end of the Y–X count and continues so as to erase the cueing pulses until the last previously recorded cueing pulse is erased.

For example, assume that the system is to operate in the "animate" mode and that an X count of four frames is desired. The armatures 108 and 109 of selector switches 103 and 104 are therefore placed at the number 4 selector positions. The counter 61 is reset to zero count by a slightly delayed preset pulse prior to receiving the delayed edit pulses from the "AND" gate 55. Note, however, that new cueing pulses derived from the delayed edit pulses cannot be recorded until the distance of forty-one frames between the cue playback head 30 and the cue record head 27 has been traveled by the tape. The counter 61 thus completes the initial 23 count and is reset to zero at the same time the "editor-start" signal is obtained from the matrix 62. The counter 61 does not again receive edit pulses until the eighteen frame counter 78 in the editor unit 34 has finished counting the next eighteen frames, at which time a "begin-X-count" signal is sent back to the program unit 32 to begin the X count (here four). When the X count is completed by the diode matrix 62, an "editor-stop" signal is returned to the editor unit 34 to stop further recording of additional frames and new cueing pulses.

As with the operation of a conventional diode matrix, the diodes 106 are disposed in the matrix so that the one selected terminal (here No. 5) is driven to a particular level only when the appropriate binary combination is presented on the output terminals of the various stages of the counter 61. Here the arrangement drives the one selected terminal to ground voltage level. Otherwise, at least one circuit path exists at any output terminal in the matrix to an output terminal in the counter 61 which is not at ground, but at a negative level, and which therefore clamps all but one matrix terminal at a negative level. The X count indication from the matrix 62 terminates the "animate" mode, and another "animate" sequence may be undertaken immediately for the addition of a like number of frames.

In the "animate erase" mode, the last previously recorded cueing pulse is detected in the same fashion. In this mode, however, no video recording is undertaken, and accordingly the editor unit 34 need not be utilized. In order to detect the Y–X count, the system in accordance with the invention presets the counter 61 to the X count through the selector switches 103A and 103B and the bilateral diode matrix 62. Then, the matrix 62 detects the occurrence of the Y value, which actuates the cueing erase operations so as to erase the cueing pulses with the last previously recorded animation sequence.

For presetting, it should be noted that the diodes 106 of the matrix 62 are arranged such that a common path for positive-going signals exists from the selected switch position to the proper output terminals of all of the binary divider stages. Thus the various stages, which are to have one-valued settings, are concurrently shifted in state by the distributed preset signal. The program counter 61 is initially reset by an undelayed preset pulse to a count of all zeros so that only the stages having one-valued counts for the particular preset value will be inverted. When the preset signal, which is slightly delayed in a delay circuit 112, is then applied as a ground potential to the collector terminals in the binary divider stages through the selected diode paths, only the selected stages are switched to the opposite binary state. Thus, in the "animate erase" mode, the counter 61 begins with the given X count corresponding to the number of frames used in the particular animation sequence, and proceeds to count upwardly to the fixed Y value of thirty-seven frames. Inasmuch as no video recording or erasing takes place, the only function undergone here is activation of the cueing erase head 28 when the first cueing pulse for the last previously recorded animation frame is thereunder. Erasure continues until the last previously recorded cueing pulse has passed the cue erase head 28, at which time the "animate erase" mode may then terminate.

A feature of the present invention is the achievement of particular economies in the arrangement of the bilateral diode matrix 62 and the multi-position switches 103A and 103B. By coupling the first binary divider stage in series with the first and second switches 103A and 103B, and by interconnecting successive odd and even values in the second switch 103B, half of the selection function is taken over by the switches themselves. The first binary divider stage, of course, represents 2° in the binary system. When this stage indicates a zero value, positive output signals cannot appear on the odd valued output terminals of the second switch 103B. Accordingly, by coupling the armatures 108 and 109 together, automatic selection between odd and even values is accomplished.

Also, particular economies are realized in the construction of the bilateral diode matrix 62 itself. It should be noted that a single diode connects each of the signal junctions to the output terminal of the highest order binary divider stage which will be in a binary one state when the counter 61 contains a count equal to the count represented by that signal junction. Each of the higher count junctions is then connected to a lower order count junction which represents the difference in the count represented by the highest order binary stage and the count represented by the particular higher order count junction. The diodes interconnecting the signal junctions are poled to provide a conductive path from the higher order signal junctions through the lower order signal junctions and through the diodes connected thereto to each of output terminals of the lower order stages of the binary counter 61. In this manner, any count within the counter may be detected by the appropriate junction and any count may be set into the counter by application of a signal to the appropriate junction without requiring an unnecessary number of diodes in forming the matrix.

While there have been described above and illustrated in the drawings various forms of digital control systems in accordance with the invention, it will be appreciated that many other modifications, variations and alternative forms are possible. Accordingly, the invention should be considered to include all exemplifications falling within the terms of the appended claims.

What is claimed is:

1. A system for providing and correcting animation effects in a television program recording system which records successive cue pulses denoting successive individual frames adjacent to transverse video tracks disposed on the recording medium and comprising: cue pulse reproducing means disposed adjacent the recording medium at a selected point; video recording and reproducing means, displaced from the cue pulse reproducing means along the recording medium at a selected first distance; cue pulse erasing means disposed along the recording medium at a selected second distance from the cue pulse reproducing means; cue pulse recording means disposed along the recording medium at a third selected distance from the cue pulse reproducing means; means responsive to the reproduced cue pulses from the cue pulse reproducing means for identifying the last cue pulse of a sequence; counting means responsive to the detection of the last previously recorded cue pulse and coupled to the video recording and reproducing means for controlling the adding of a successive number of individual frames to the last previous recording along the recording medium; means responsive to the detection of the last previously recorded frame for actuating the counting means after a preselected interval, such that the recording medium is appropriately disposed relative to the video recording and reproducing means, the cue pulse erasing means and the cue pulse recording means; and means responsive to the selection of an animate erase mode for presetting the means for counting to a count corresponding to the selected number of frames.

2. A system for providing and correcting animation effects in a television program recording system comprising: means for identifying successive program segments along a recording medium; means displaced from the first means along the recording medium for recording and modifying recorded television program signals; counter means responsive to the first means for counting the successive program segments; and diode matrix means coupled to output terminals of the counter means for selectively detecting predetermined counts and presetting the counter means to a preselected count, said diode matrix means including a plurality of individual signal junctions, each representative of a different count in the counter sequence, a first plurality of diodes individually connecting each junction in a first conducting direction to a selected output terminal of the counter which assumes a first signal level whenever the counter contains the count represented by the respective junction, a second plurality of diodes individually connecting each junction in said first conducting direction to another junction representative of another count which is represented at the other output terminals when the selected count is present, said first plurality of diodes being placed in a forward conducting direction when the associated output terminal has a first output level, selector means for connecting a selected one of said junctions through a control terminal, whereby said control terminal assumes a second signal level only when the binary counter contains the count represented by the selected signal junction, and means for applying a second signal level to said control terminal to control the state of the counter to assume a count represented by the selected signal junction.

3. A system for providing and correcting animation effects on a moving tape in a television program recording system comprising first recording means for recording successive program segments in separate transverse tracks on a tape, second recording means spaced a fixed interval downstream of the first recording for concurrently recording a separate cue pulse to identify each successive recorded program segment along the tape, first erasing means for erasing cut pulses and spaced at a fixed interval between the first and second recording means for erasing cue pulses previously recorded, second erasing means disposed at a fixed interval upstream of said first recording means for erasing successive program segments on the tape, means positioned at a fixed interval upstream of said second erasing means for reproducing cueing pulses previously recorded on the tape, timing means for providing timing pulses in synchronism with the reproduced cue pulses from the reproducing means, circuit means responsive to the absence of reproduced cue pulses from the reproducing means for providing the timing pulses to identify additional program segment intervals along the tape, each of the fixed intervals between said recording, erasing and reproducing means being equal to a given number of program segment intervals, resettable first counting means responsive to a first output signal for counting said timing pulses up to a first number defining the number of program segment intervals in the fixed interval between said first recording means and said second recording means plus the fixed interval between said reproducing means and said second erasing means, said second erasing means being responsive to a second output signal produced by said first counting means upon reaching the first number to initiate erasure of upstream program segment intervals on the tape, second counting means for counting a second number of timing pulses after said first number equal to the number of program segment intervals in the fixed interval between said second erasing means and said first recording means, said second counting means being responsive to said second output signal to begin the count and providing a third output signal at the end of the count, said third output signal to record said first recording means being responsive to additional program segments on the tape beginning with the erased portion, said second output signal being applied to reset the first counter to a zero count, means for sensing the last previously recorded cue pulse in the sequence on the tape to apply the first output signal to said first counting means, and selectable count means coupled to said first counter for choosing a count equal to the number of additional program segments to be added and providing a fourth output signal upon said selectable count being reached by the first counter, said first and second recording means and said second erasing means being responsive to said fourth output signal to be deenergized after the additional program segments are recorded.

4. The system of claim 3 further comprising switching means including means for applying a preset pulse through said selectable count means to set said first counting means to a count equal to the number of program segments to be revised and for causing first counting means producing a fifth output signal upon counting from the present to a fixed count equal to the number of successive program segment intervals in the fixed interval between said reproducing means and said first erasing means, said switching means at the same time disconnecting said second erasing means and said second counting means from said selectable count means.

5. A system for providing controlled animation effects in a television tape recorder including the capability of revising animation effects comprising means for recording successive television frames; means for erasing recorded television frames; means for recording separate cue pulses to denote each recorded television frame, the cue pulses having a selected spatial relationship to the individual television frames with which they are associated, timing means for providing individual count pulses for successive television frame intervals; counter means responsive to the count pulses for counting successive television frame intervals; count selection means coupled to the counter means for detecting selected counts, means responsive to the cue pulses recorded of the last successive television frame to deliver count pulses to the counter means; means coupled to the count selection means for selectively presetting the counter means to a preselected initial count; and means responsive to different selected counts for initiating operation of the recording and erasing means for television frames and for cue pulses.

6. A system for providing controlled animation effects in a television tape recorder comprising means for selectively recording and erasing successive television frames; means for recording and erasing separate cue pulses denoting each successive television frame; means for detecting the last successively recorded cue pulse to provide a gating signal; timing means defining successive television frame intervals with timing pulses; counter means for counting the timing pulses; gating means responsive to the gating signal for intiating the coupling of the timing pulses to the counter means; means for setting the counter to a predetermined count before the occurrence of said gating signal; and count detection means responsive to different selectable counts in the counting sequence of the counter means for selectively operating said means for recording and erasing cue pulses to add a predetermined number of new cue pulses and erase another predetermined number of cue pulses; and means responsive to the recorded cue pulses to control said means for recording and erasing successive television frames in response to the recording and erasing of successive cue pulses.

7. A system for providing controlled and revisable animation effects in a television tape recorder including the combination of first recording means for recording television frames along the length of the tape; first erase means for erasing television frames spaced along the tape upstream from the means for recording, second record means for recording marker pulses identifying individual frames along the length of the tape; first reproduce means positioned at a selected point along the length of the tape for reproducing recorded marker pulses; second erase means positioned at a known frame distance from the first reproduce means for erasing marker pulses; means for counting television frame intervals; control means responsive to selected counts of the counting means for energizing the first erase means and said first and second record means in a timed relation to operate upon the identical frame intervals on the tape, said control means including means for identifying the last in a sequence of recorded marker pulses for energizing said counting means, and count selection means coupled to the counting means for deenergizing the first erase means and the first and second record means after recording of a selected number of additional television frames and associated marker pulses, said count selection means also including means for setting the counting means to a preselected count representing a selected number of frames to be revised and for detecting a total count equal to the known frame distance for energizing the means for erasing marker pulses.

8. A system for providing and correcting animation effects in a television program recording system wherein each successive program segment along a recording medium is identified by the presence or absence of a corresponding pulse recorded on the medium, comprising counter means for counting the successive program segments, means responsive to the absence of one of said corresponding pulses for initiating a count of predetermined duration in said counter means, means responsive to a first external command for erasing program segments during said predetermined count, means responsive to the first external command for recording program segments and corresponding pulses during said predetermined count, and means responsive to a second external command for erasing the pulses corresponding to the successive program segments, during said predetermined count.

9. The invention set forth in claim 8 above, further including means responsive to said first external command and to the detection of the absence of one of said corresponding pulses for providing a second count of predetermined duration in said counter means prior to the initiation of said predetermined count, the duration of said second count being determined by the physical spacing between the means responsive to the absence of one of said corresponding pulses and said means for erasing program segments.

References Cited

UNITED STATES PATENTS

| | | | |
|---|---|---|---|
| 2,697,549 | 12/1954 | Hobbs | 328—46 |
| 3,035,767 | 5/1962 | Orr | 235—132 |
| 3,051,777 | 8/1962 | Lemelson | 178—6.6 |
| 3,054,985 | 9/1962 | Mason | 340—166 |

JOHN W. CALDWELL, *Acting Primary Examiner.*

DAVID G. REDINBAUGH, *Examiner.*

H. W. BRITTON, *Assistant Examiner.*